(12) United States Patent
Giambiagi

(10) Patent No.: US 9,372,973 B2
(45) Date of Patent: *Jun. 21, 2016

(54) PROVISIONING USER PERMISSIONS ATTRIBUTE-BASED ACCESS-CONTROL POLICIES

(71) Applicant: AXIOMATICS AB, Stockholm (SE)

(72) Inventor: Pablo Giambiagi, Stockholm (SE)

(73) Assignee: AXIOMATICS AB, Stockholm (SE)

( * ) Notice: Subject to any disclaimer, the term of this patent is extended or adjusted under 35 U.S.C. 154(b) by 83 days.

This patent is subject to a terminal disclaimer.

(21) Appl. No.: 14/522,300

(22) Filed: Oct. 23, 2014

(65) Prior Publication Data

US 2015/0128210 A1    May 7, 2015

Related U.S. Application Data

(63) Continuation of application No. 13/621,338, filed on Sep. 17, 2012, now Pat. No. 8,881,226.

(60) Provisional application No. 61/535,583, filed on Sep. 16, 2011.

(51) Int. Cl.
G06F 21/31     (2013.01)
H04L 29/06     (2006.01)

(52) U.S. Cl.
CPC ............... *G06F 21/31* (2013.01); *H04L 63/20* (2013.01)

(58) Field of Classification Search
CPC ................................. G06F 21/31; H04L 63/20
See application file for complete search history.

(56) References Cited

U.S. PATENT DOCUMENTS

| | | | |
|---|---|---|---|
| 8,667,556 B2 | 3/2014 | Chang et al. | 726/1 |
| 2006/0206440 A1 | 9/2006 | Anderson et al. | 705/500 |
| 2007/0056018 A1* | 3/2007 | Ridlon | H04L 63/102 |
| | | | 726/1 |
| 2007/0056019 A1 | 3/2007 | Allen et al. | 726/1 |
| 2008/0184335 A1* | 7/2008 | Zhang | G06F 21/6218 |
| | | | 726/1 |
| 2009/0288135 A1 | 11/2009 | Chang et al. | |
| 2009/0288136 A1 | 11/2009 | Chang et al. | 726/1 |
| 2010/0257579 A1 | 10/2010 | Karjoth et al. | |

(Continued)

OTHER PUBLICATIONS

Shu et al., Detecting Conflicts in ABAC Policies with Rule-reduction and Binary-search Techniques, Jul. 2009, IEEE International Symposium on Policies for Distributed Systems and Networks, pp. 182-185.*

(Continued)

*Primary Examiner* — Kenneth Chang
(74) *Attorney, Agent, or Firm* — Nixon & Vanderhye PC

(57) ABSTRACT

An attribute-based access control policy (e.g., XACML policy) for a set of elements depends on attributes carried by elements in one of several predefined categories. In order to evaluate such policy for a set of elements, the invention provides a method including the steps of (I) selecting a primary category; (II) partitioning the elements in the primary category into equivalence classes with respect to their influence on the policy; and (III) using the equivalence classes to replace at least one policy evaluation by a deduction. The result of the evaluation may be represented as an access matrix in backward-compatible format. The efficiency of the policy evaluation may be further improved by applying partial policy evaluation at intermediate stages, by forming combined equivalence classes containing n-tuples of elements and/or by analyzing the influence of each element by extracting functional expressions of maximal length from the policy.

16 Claims, 2 Drawing Sheets

(56) References Cited

U.S. PATENT DOCUMENTS

2010/0325692 A1    12/2010  Rissanen ........................ 726/1
2012/0246695 A1*   9/2012  Cameron ............ G06F 21/6218
                                                          726/1

OTHER PUBLICATIONS

Extended European Search Report for EP 11181498.4-1243, dated Mar. 14, 2012.

International Preliminary Report on Patentability from the International Preliminary Examining Authority in International application No. PCT/EP20121068235, mailed Sep. 19, 2013.

Mohan, A.; Blough, DM., "AttributeTrust A Framework for Evaluating Trust in Aggregated Attributes via a Reputation System," Privacy, Security and Trust, 2088. PST '08, Sixth Annual Conference on, vol., No., pp. 201, 212, Oct. 1-3, 2008.

* cited by examiner

PROVISIONING USER PERMISSIONS ATTRIBUTE-BASED ACCESS-CONTROL POLICIES

BACKGROUND OF THE INVENTION

The invention disclosed herein generally relates to the field of access control (AC) in computer systems. In particular, it provides devices and methods useful for provisioning user permissions on the basis of an attribute-based access control (ABAC) policy.

BACKGROUND OF THE INVENTION

An ABAC policy defines access control permissions based on the attributes of the subject, of the resource, and of the action that the subject wants to perform on the resource (e.g., read, write). A resource may be, inter alia, a portion of a personal storage quota, a business unit storage quota, an information retrieval system, a (portion of a) database, an online service, a protected webpage or a physical device.

There currently exist general-purpose AC languages that have the richness to express fine-grained conditions and conditions which depend on external data. One particular example of an AC language is the eXtensible Access Control Markup Language (XACML) which is the subject of standardization work in a Technical Committee of the Organization for the Advancement of Structured Information Standards (see http://www.oasis-open.org). A policy encoded with XACML consists of functional expressions in attribute values, and the return value (decision) of the policy is one of Permit, Deny, Not Applicable, or Indeterminate. An XACML policy can apply to many different situations, that is, different subjects, resources, actions and environments and may give different results for them. The XACML specification defines how such a request is evaluated against the policy, particularly what policy attributes are to be evaluated or, at least, which values are required to exist for a successful evaluation to result. Key characteristics of this evaluation process are that the request (the query against the policy) must describe the attempted access to a protected resource fully. In practice, it may be that the request is constructed in multiple stages by different components, so that a PEP (Policy Enforcement Point) provides only some initial attribute values and a PDP (Policy Decision Point) or other components can dynamically fetch more values from remote sources as they are needed.

XACML-based solutions typically introduce "authorization as a service" whereby a Policy Enforcement Point (PEP) within a target application/system captures access requests in real time and sends them to a Policy Decision Point (PDP) for evaluation against one or more XACML policies. In practice, however, many organizations have a broad range of legacy systems for which there are currently no PEP components available, and whose authorization mechanisms are built around models other than ABAC.

However, the legacy systems referred to above are based on models which are incompatible with ABAC formats, including the XACML format, but may be configured to associate permissions with (groups of) subjects and (groups of) resources. In order to still be able to define ABAC policies and thus leverage on the ABAC approach, it would be necessary to convert each ABAC policy into an equivalent configuration of the legacy access control system that preserves the intention of the ABAC policy. Such conversion, which is preferably repeated after each policy update, includes (i) defining groups of subjects and resources, and (ii) associating permissions to subject and resource groups by evaluating the policy. Since the various permissions in respect of one resource may vary depending on the action to be taken and on environment variables, it may be necessary to duplicate each resource element into several instances. For example, the permissions in respect of a resource element file1 may be expressed as permissions for the imaginary resource elements file1_read, file1_write_localaccess, file1_write_remoteaccess etc., so that each resource gives rise to several vectors over a product of different categories (in this case: Resource×Action, Resource×Action×Environment and Resource×Action×Environment, respectively, where Environment is the category of attributes that describe the context of the access).

Simple calculations reveal that considerable numbers of such groups of subjects and resources (or more generally, n-tuples of elements) arise already in mid-size organizations with a few hundreds of users. A conversion algorithm that scales linearly with respect to the number of groups will imply a large computational load, especially if the policy is updated frequently.

Considering the field of AC policy management more generally, the applications published as US 2009/0077621 A1 and US 2009/0178107 A1 are relate to conversion of AC and security policies into XACML format. With reference to an information technology (IT) system for which a high-level policy exists, US 2009/0077621 A1 describes a process in which a functional model for the IT system is determined. The functional model indicates functional system attributes of the IT system. Pre-configured rule templates are loaded, and low-level machine-enforceable rules are generated in a manner compliant with the high-level security policy by iteratively filling the rule templates with functional system attributes indicated by the functional model. Once generated, the machine-enforceable rules can be distributed to enforcement entities, e.g., an intrusion detection system. This application mentions XACML as a language suitable for expressing said machine-enforceable rules. US 2009/0178107 A1 describes a conversion process from a source policy data structure belonging to an AC system in which primary authorizations can be subject to auxiliary constraints into a corresponding data structure for a single-authorization-query AC system. An XACML system is an example of such a single-authorization-query AC system.

US 2010/0237579 A1 relates to the problem of partially serializing an XACML policy into two predicate sets: dset contains all requests (triples of subjects, actions and resources) for which the policy evaluates to Deny; pset comprises all requests for which the policy evaluates to Permit. The document does not distinguish between the two possible further decisions, NotApplicable and Indeterminate, hence will not separate the possible requests accordingly. The proposed algorithm by which the serialization is to be achieved relies on traversing the XACML hierarchy linearly. In relation to this disclosure, the invention improves the computational efficiency.

US 2007/056019 A1 is concerned with Universal Authorization Language (UAL) and discloses a technique for translating a UAL object into an access control list. As this document acknowledges, UAL is a subset of the XACML language in the sense that it allows a single PolicySet, a single combining algorithm and is significantly restricted in further respects. It is not clear whether the approach outlined in this document—to convert the policy rules into disjunctive normal form before the computations start—could be applied to a complete XACML policy. In any event does the conversion into disjunctive normal form in no way optimize the computations, which would instead scale very unfortunately with the size of the policy. In particular, the number of user groups, which are formed as a basis for the iterations, is not controlled but could apparently grow exponentially with respect to the number of attribute values. It is therefore true for this document as well that the present invention improves the computational efficiency.

SUMMARY OF THE INVENTION

It is an object of the present invention to provide methods and devices, improved from the point of view of computational complexity, for provisioning user permissions equivalent to an ABAC policy in a form suitable for legacy access-control systems. It is a particular object to provide such methods and devices for provisioning user permissions represented as an access matrix.

As used in this disclosure,
subjects and resources are categories; optional further categories are actions and environments; each element belongs to exactly one category;
an attribute is a characteristic of an element which may be referenced in expressions, particularly predicates, conditions and rules, within a policy; and
an access matrix or access control matrix is a two- or higher-dimensional data structure associating Permit, Deny or possibly some other decision with each n-tuple of elements in different categories; access matrices, which may be represented as lookup tables, are generally an acceptable form for expressing permissions in relation to subjects in a legacy access-control system.

An example of a simple access matrix may be visualized as follows:

TABLE 1

Access matrix 1

|  | User1 | User2 |
| --- | --- | --- |
| Printer1 | Permit | Permit |
| File1 | Deny | Permit |

In a more complex situation, in which the permissions depend on the type of action, the access matrix may include this as a third dimension and as such have the following appearance:

TABLE 2a

Access matrix 2, read permissions

|  | User1 | User2 |
| --- | --- | --- |
| File1 | Deny | Permit |
| File2 | Permit | Permit |

TABLE 2b

Access matrix 2, write permissions

|  | User1 | User2 |
| --- | --- | --- |
| File1 | Deny | Permit |
| File2 | Deny | Deny |

As already noted, the same information may be encoded by duplicating each resource or each subject, so that the different values of the action or environment attribute can be included.

The inventors have realized that the structure of an ABAC policy can be utilized in order to reduce the number of numerical operations that are necessary for evaluating the policy for a set of relevant elements. These insights form the basis for the methods and devices defined in the independent claims. The dependent claims define advantageous embodiments.

In a first aspect, the invention provides a method for evaluating an ABAC policy which includes attributes pertaining to at least two categories, e.g., subjects and resources. The method will be briefly discussed in what follows, partially in terms of mathematical formulae which are intended to add another angle to the presentation and not to limit the scope of the invention to a literal interpretation of the formulae. The method is preferably computer-implemented, as will be illustrated in the following discussion.

A first step of the method involves a computer selecting one of the categories, which is referred to as 'primary' in what follows. The selection may be random or quasi-random in some embodiments; alternatively the selection may include a preference for a particular category, such as a category determined by comparative tests of the type to be discussed below. In order to simplify the evaluation of the policy, the set $\{x_i: i \in I\}$ of elements in the primary category (where I is the index set of the elements in the primary category) are to be partitioned into one or more primary equivalence classes $X_1, X_2, X_3, \ldots$ with the property that any two elements in the same primary equivalence class influences the evaluation of the policy in the same way. This is to say, all elements in an equivalence class provide an identical set of values of the extracted expressions.

As an initial substep, the computer carrying out the method extracts expressions (occasionally called sub-expressions) $e_1, e_2, \ldots, e_m$ which may include operators, constants, attributes in the primary category but no attributes in other categories. Whether an attribute is in the primary category or not follows immediately from the ABAC policy; indeed, rules which have been defined in compliance with standardized XACML 3.0 language are required to specify a category for each referenced attribute. The last condition—no attributes in other categories—implies a non-absolute upper bound on the length of the extracted expressions. The expressions evaluate to numeric, logic or other values (e.g., real, rational, integer, Boolean, predefined execution states). There is no lower bound on the length of the extracted expressions; in view of computational economy, however, it is rarely meaningful to extract an expression so short that it includes an attribute and nothing else, nor to extract an expression which does not contain any attribute at all and which may, for this reason, evaluate to a constant.

In a further substep, all values of attributes $a_1, a_2, \ldots, a_n$ carried by the elements in the primary category are extracted by the computer. The elements that will be considered will depend on the nature of the extracted expressions. All elements in a given category need not carry the same set of attribute values. Instead, all those elements which carry any of the attributes appearing in the extracted expressions are considered, so that all existing values of these attributes are collected. The values may be represented as a set of value vectors, $V = \{(v_{1i}, v_{2i}, \ldots, v_{ni}) : i \in I\}$, wherein element $x_i$ carries attribute values $(a_1, a_2, \ldots, a_n) = (v_{1i}, v_{2i}, \ldots, v_{ni})$. Since two elements may have identical attribute value vectors, the set V may have lower cardinality than the number of elements in the primary category.

In a subsequent substep, the computer evaluates the expressions for these attribute value vectors, which allows the elements to be partitioned into one or more primary equivalence classes. It will become clear after this whether the elements carry unique sets of values or, which will require less processing resources, whether equivalence classes with two or more elements can be formed. The ABAC policy identifies all relevant attributes, and the attribute values can be provided by a policy enforcement point (PEP, see below) directly or may be retrieved from remote sources. This is discussed below and in section 7.3.5 of the XACML 3.0 Specification.

More precisely, the extracted expressions may be regarded collectively as a mapping $$E(a_1, a_2, \ldots, a_n) = (e_1(a_1, a_2, \ldots, a_n), e_2(a_1, a_2, \ldots, a_n), \ldots, e_m(a_1, a_2, \ldots, a_n))$$

from n-dimensional space which takes values in m-dimensional space. Each distinct value that E assumes for a vector in V justifies a further primary equivalence class to be defined, so as not to lose information. (Put differently, each unique set of values that the extracted expressions assume corresponds to one primary equivalence class.) Hence, the primary equivalence classes are defined in accordance with the outcome of the evaluation. The number of equivalence classes is at least Card $E(V)$, the cardinality of the image of V under the mapping E. Since one or more expressions may evaluate to the same value for two distinct attribute value vectors in V, Card $E(V)$ is less than or equal to Card V. Hence, $$\text{Card } I \geq \text{Card } V \geq \text{Card } E(V). \quad (1)$$

As already explained, the method will utilize the fact that any two elements within an equivalence class will influence a policy evaluation in the same way, and will therefore involve a computational saving if one of the inequalities (1) is strict.

Having defined primary equivalence classes with the above properties, the method may optionally treat one or more further categories—referred to as 'secondary', 'tertiary' and so forth—in order to refine the equivalence classes or to extend the partition by including further elements, e.g., elements from further categories. Whereas this optional feature will be discussed in greater detail below, focus will now remain on the case of simple primary equivalence classes.

The ABAC policy can be evaluated by the computer for a set of attributes carried by a combination of elements from different categories, such as attributes belonging to a subject and a resource, wherein the value (or decision) of the policy may express the permissions of the subject in respect of the resource. Because the expressions are functional expressions, the term "evaluate" has no other significance in this context than its ordinary meaning in mathematics, that is, the computer substitutes specific values (the attribute values) for variables (the attributes) and performs the arithmetic operations involved. The meaning of "combination" is the normal one: a combination of elements is obtained by merely providing a vector with those elements and providing the vector as input to the ABAC policy. Because the ABAC policy may depend on all policies, the act of combining elements (i.e., combining attributes from elements) ensures that the ABAC policy will be well-defined; otherwise, it may for instance lack some attribute values. In general, a policy may evaluate for attributes carried by combinations having different numbers of elements, as additional attributes (e.g., environment attributes, action attributes) may be required for some combinations of resources and subjects but not for all. A complete evaluation of the ABAC policy will involve evaluating it for attributes carried by all possible combinations (n-tuples) of elements. In the case of three categories, the policy is to be evaluated for all attribute value vectors carried by the elements in the set $\{(x_i, y_j, z_k) : i \in I, j \in J, k \in K\}$, where J, K are the index sets of the remaining, non-primary categories. In view of the equivalence classes, it is sufficient to evaluate the policy for the attributes carried by the triple $(x_1, y_j, z_k)$ to know the values (decisions) for all triples $(x, y_j, z_k)$ in which the arbitrary primary-category element is equivalent to $x_1$, namely where $x \sim x_1$. The concerned primary equivalence class is represented by an element therein, and so the act of deriving the input vector by combining elements will not involve any format conversion or the like. In other words, to evaluate the policy for the triple $(x_1, y_j, z_k)$, letting P be the policy and A be an attribute-extraction function in respect of an n-tuple of elements, one has:

$$P(A(x, y_j, z_k)) = P(A(x_1, y_j, z_k)) \text{ for all } x \sim x_1, j \in J, k \in K. \quad (2)$$

Here, the variable portion of the input to the policy is a vector $(y_j, z_k)$ with one element from each remaining category. (Clearly, this vector will have length one for a policy that is well-defined for two categories only.) Because elements in all categories on which the policy depends (or rather, attributes in all such categories) are provided as input, the policy will evaluate in the normal fashion. It follows from the above explanations that equation (2) holds, because all elements in an equivalence class provide an identical set of values of the extracted expressions. For this reason, it is indifferent whether one element or another is selected, provided they belong to the equivalence class. Hence, the replacement of a first element by a second element that is equivalent to the first one will not change the final value of the ABAC policy, which means that one policy evaluation will suffice. This implies that a number of policy values can be deduced from previous evaluations relating to the same equivalence class.

A complete evaluation of the policy (for all triples) done in the straightforward way would in this case have required Card I×Card J×Card K evaluations. The invention achieves its purpose since a complete evaluation can be performed in a reduced number of policy evaluations, namely down to Card $E(V)$×Card J×Card K evaluations, which is a potential saving in view of (1).

While the inventive method includes partitioning the elements in one category into equivalence classes, a variation of this method may readily—and without departing from the scope of the invention—include partitioning elements belonging to some other group, independently of the categories to which they belong. The method described above is advantageous, however, if the purpose is to form an access matrix that is to be populated with policy values (decisions) in a row-wise or column-wise sequence, since this may give rise to numerous applications of equality (2). In general, each category is selected from the group comprising subjects, resources, actions and environments.

It is advantageous though not strictly speaking necessary to extract as long expressions as possible from the policy. Preferably, the expressions are extracted in order for them to have maximal length provided they contain no attributes from other categories. It is also suitable to impose a condition that the expression is susceptible of evaluation. For example, in the logical statement $x+2<y$, where x belongs to the primary category but y does not, it is meaningful to extract $x+2$ but not $x+2<$.

As another variation of the above method, the formation of primary equivalence classes may be simplified. More precisely, instead of considering the extracted expressions collectively, as a many-dimensional mapping, the primary equivalence classes $X_{p,q}$ are instead based on the images of V under each extracted expression, that is, $e_1(V), e_2(V), \ldots, e_m(V)$. To account for the case that all combinations of expression values are assumed, one may define $\Pi_{r=1}^m$ Card $e_r(V)$ equivalence classes. As an example, suppose $m=2$ and $e_1(V) \approx \{X_{1,1}, X_{1,2}, X_{1,3}\}$, $e_2(V) \approx \{X_{2,1}, X_{2,2}\}$. The primary equivalence classes may then be defined as the intersections $X_{1,1} \cap X_{2,1}$, $X_{1,1} \cap X_{2,2}$, $X_{1,2} \cap X_{2,1}$, $X_{1,2} \cap X_{2,2}$, $X_{1,3} \cap X_{2,1}$ and $X_{1,3} \cap X_{2,2}$. It is recalled that each set of equivalence classes is a partition, that is, $V = \cup_q VV X_{p,q}$ for all p; the collection of six equivalence classes obtained as intersections clearly shares this property. If information about the correlation between different expressions is available, one may reduce this number by omitting equivalence classes which correspond to such combinations of expression values that are never attained and which are therefore empty.

The computational efficiency of the method can be improved further by evaluating the ABAC policy partially to obtain a simplified policy. In particular, to evaluate the policy for all combinations of elements in a given primary equivalence class, represented by an element $x_1$, one may define the simplified policy $$Q_{x_1}(y,z) = P(A(x_1,y,z)) \quad (3)$$

which is obtained by evaluating policy P partially for the attributes of $x_1$ while maintaining y, z as variable 'wild cards'. The influence from the element $x_1$ that represents the primary equivalence class is built into the policy $Q_{x_1}$ that is to be used for evaluation. Indeed, $Q_{x_1}$ may be used to evaluate the policy P not only for the combination of the representative element $x_1$ and a first vector $(y_{10}, z_7)$ of elements in the remaining categories, but also to evaluate the policy for $x_1$ combined with one or more different vectors of elements in remaining categories, such as $(y_2, z_7)$ and $(y_2, z_6)$. Since the simplified policy $Q_{x_1}$ can be represented as a simpler set of processing instructions, it is in general more economical to evaluate. As far as the XACML context is concerned, it is noted that the simplified policy may be represented in the same form as the original policy. However, the simplified policy may in some cases require a richer representation than standard XACML, possibly including a number of new quasi-error states arising from the fact that the request is incomplete for lack of values of the attributes carried by the wild cards. For instance, a situation may arise in which a rule cannot be evaluated for lack of target or lack of values assumed by the attributes appearing in a condition in the rule. Possibly, the partial evaluation may then temporarily override the evaluation rules according to the XACML standard, which may specify that an evaluation error is to be signaled, and store an indication that the rule is indeterminate. This is useful in the context of partial evaluation, since it may turn out, when the combining algorithms of the policy are applied to the partial request, that the sub-tree in which this rule is located is inconsequential to the policy evaluation, so that either a final policy decision may be returned or this sub-tree may be excised from the simplified policy. Similarly, if the simplified policy is not represented in standard XACML, evaluation engines adapted for standard XACML may need to be modified to be able to evaluate simplified policies. The applicant's co-pending International Application published as WO 2012/062779 discloses systems and methods for partial evaluation of ABAC policies and is hereby incorporated by reference in its entirety.

The method described above can be extended by defining combined equivalence classes relating to two, three or more categories. The elements in such combined equivalence classes are pairs, triples or n-tuples (n≥4) of elements. To this end, the steps of selecting a further ('secondary') category, extracting expressions containing attributes from no other category than the secondary category, extracting values of these attributes and evaluating the expressions are repeated. This will result in a corresponding partition of the elements in the secondary category into secondary equivalence classes. If the primary and secondary equivalence classes are denoted $X_1, X_2, X_3, \ldots, X_{N_X}$ and $Y_1, Y_2, Y_3, \ldots, Y_{N_Y}$, respectively, then combined equivalence classes can be defined as the Cartesian products $$W_{p,q} = \{(x,y) : x \in X_p, y \in Y_q\}, 1 \le p \le N_X, 1 \le q \le N_Y.$$

The skilled person will understand how this expression can be generalized in an obvious manner to a situation where tertiary or higher equivalence classes have been defined.

The previous extended variation of the method, which forms equivalence classes in respect of elements in more categories than a selected primary category, can be improved from the point of view of computational performance. This is performed by partially evaluating the policy for each primary equivalence class, not at the moment of evaluating the policy for all elements, as previously described, but before the formation of secondary equivalence classes begins. In other words, according to some embodiments of the invention, the method initially acts on the original policy P and then, after the primary classes have been defined, goes on to analyze one or more simplified policies $Q_{x_1}, Q_{x_2}, \ldots$ obtained by partial evaluation. More precisely, the expressions containing attributes in the secondary category are extracted from one of the simplified policies resulting after partial evaluation for elements representing one of the primary equivalence classes. Since the processing leading up to the secondary equivalence classes is thus performed on simplified policies, which are in general simpler code objects, as outlined above, a computational saving can be expected. When the secondary equivalence classes have been formed, the evaluation can proceed with or without partial evaluation for elements representing the secondary equivalence classes.

For the evaluation of a given policy, it has been observed that the choice of the 'primary' and 'secondary' categories may sometimes have a significant impact on the performance. Hence, when an evaluation method according to the invention is being implemented, it may be advisable to carry out comparative tests for different choices of 'primary' category and possibly other categories. The best performing choice may be selected for later use in the implementation. Apart from these empirical findings, no general rule to guide the selection of the 'primary' category has yet emerged.

An intended use of the method outlined above is to convert an ABAC policy into access-matrix form by evaluating the latter for a set of elements, which may be the users and resources in a given system. The ABAC policy may be encoded as a data record and the resulting access matrix may be stored as a second data record. The second data record may be in a form that is directly loadable into a legacy system lacking the ability to handle (especially, to evaluate) ABAC policies.

In particular, the invention allows an access-matrix evaluation means to be used for implementing or enforcing an existing ABAC policy. The access-matrix evaluation means is configured to return an access permission in response to a request comprising a combination (or n-tuple, where n is not necessarily equal to occurrences of n above) of elements in different categories. Indeed, the invention provides for converting the ABAC policy into a legacy system-readable form and maintaining the equivalence between the two representations of the policy with low latency time. As used herein, the access matrix is equivalent to the ABAC policy if it yields the same decision for a combination of elements as the ABAC policy would have returned for the attribute values carried by this combination of elements. The legacy system-readable representation is maintained in a storage means which is communicatively coupled to the access-matrix evaluation means, so that it can be accessed by the access-matrix evaluation means.

In a second and third aspect, the invention provides a computer-program product and a policy converter for performing the method outlined above. The computer program and policy converter generally shares the advantages and potential for further developments with the first aspect of the invention.

Advantageously, the policy converter includes a processing means adapted to maintain the resulting access matrix (or other representation readable by a legacy system) so that it stays equivalent with the ABAC policy each time this is updated or revised.

It is noted that the invention relates to all combinations of features, even if these are recited in mutually different claims.

BRIEF DESCRIPTION OF THE DRAWINGS

Embodiments of the present invention will now be described in more detail with reference to the accompanying drawings, on which.

DETAILED DESCRIPTION OF EMBODIMENTS

Figure 1:
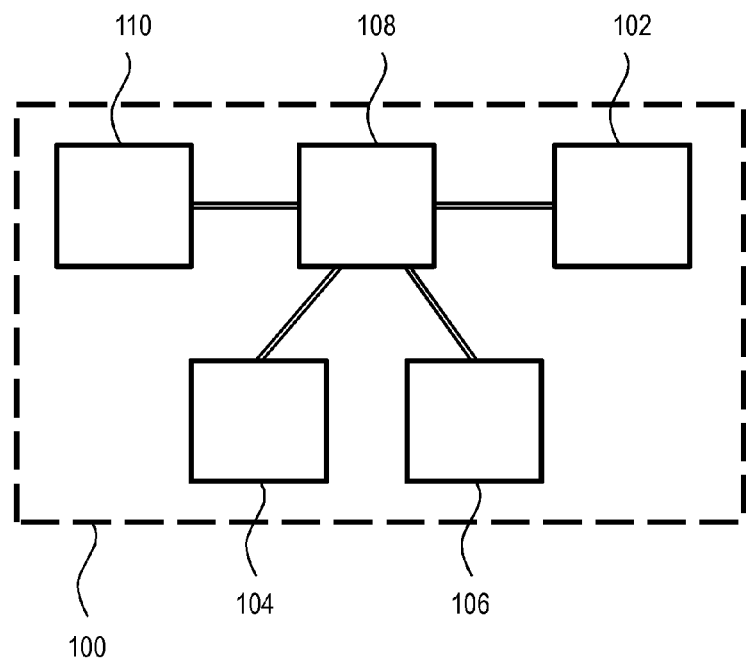
FIG. 1 illustrates an exemplifying AC policy architecture.

FIG. 1 is a generalized block diagram of the XACML architecture 100, although simplified, according to the prior art. As stated before, XACML is an access control policy language. An attempt to access a resource 102 is represented as a "Request", which lists attributes of the subject 104, the resource 102, the action and the environment 106. An attribute is an identifier, a data type and a value. It can also be described as a variable with a name (the identifier), a data type and a value. Most facts relating to the subject 104, the resource 102, the action and the environment 106 can be described in terms of attributes.

The request is constructed by a PEP 108. The purpose of a PEP 108 is to guard access to a resource 102 and only let authorized users through. The PEP 108 itself does not know who is authorized, but it submits the request to a PDP 110, which contain policies governing what requests are to be permitted or denied, respectively. The PDP 110 evaluates the policies and returns a permit/deny response to the PEP 108. The PEP 108 then either lets the access proceed or stops it. As already noted, the PEP (Policy Enforcement Point) may provide only some initial attribute values and the PDP (Policy Decision Point) or other components may dynamically fetch more values from remote sources as they are needed. If all necessary values cannot be retrieved, the policy evaluation may return an output to the effect that the policy is indeterminate or not applicable in the circumstances, or an error message.

A purpose of this architecture is to establish separation of concerns, that is, to differentiate between policy decision making and policy enforcement. Enforcement is by its nature specific to a particular resource 102, while a decision engine can be made general purpose and reusable.

Figure 2:
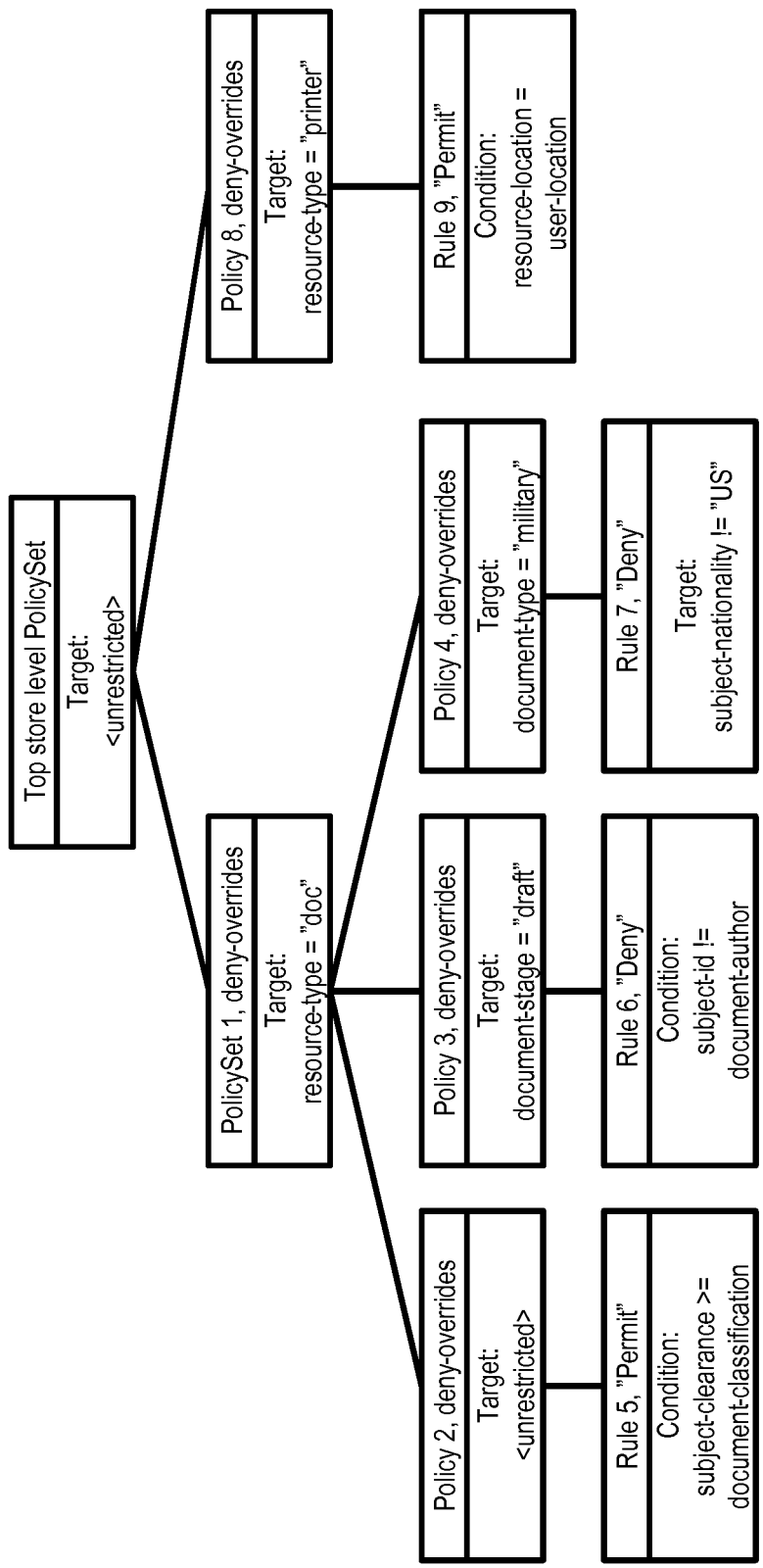
FIG. 2 is a tree representation of an AC policy set.

In general, policies can be nested to form a policy set, which may be visualized in a tree form of the type shown in FIG. 2. The combination of different policies is governed by combining algorithms, which define what policy takes precedence over another policy. The node "PolicySet 1" in FIG. 2 is of the "deny-overrides" type, so that a "Deny" decision from one of the three sub-trees will take precedence. Alternatively, sub-trees may also connect at a "permit-overrides" node.

At the lowest level of the tree shown in FIG. 2, there are rules including effects (e.g., "Deny") and underlying conditions formulated in terms of attributes, for instance, "subject-nationality !='US'", where "subject-nationality" is a subject attribute and "US" is a constant. These conditions are examples of expressions that may, in the sense of the present invention, be extracted from the policy. Clearly, the conditions may be subdivided further down to constants, attributes and logical operators. In terms of the tree representation, this corresponds to splitting a condition into a sub-tree having constants and attributes as its leaves. The expression "subject-nationality !='US'" lends itself to being extracted from the policy since it does not contain attributes that pertain to more than one category. In contrast, the condition "resource-location=user-location" is not well suited to be extracted, since the attributes on either side of the equality operator pertain to elements in different categories. On the other hand, it may make sense to extract "resource-location" (if resource is the primary category), since it may be expected that the number of values is considerably lower than the number of resources.

It will now be discussed how elements with identical effect on the policy evaluation can be identified. The values attached to an attribute by a request affect the decision returned by the PDP as long as the policy refers to the attribute in at least one of its expressions.

For example, if a target in a policy P includes the following Match element:

```
<Match MatchId="[...]string-equal">
    <AttributeValue DataType=
    "[...]string">SalesDept</AttributeValue>
    <AttributeDesignator MustBePresent=
    "false" Category="[...]access-subject"
    AttributeId="department" DataType="[...]string"/>
</Match>
``` then it can be concluded not only that the values of the department attribute may affect the PDP's decision, but also that (at least for a part of the policy) what really matters is whether the value "SalesDept" appears among the values attached to the attribute by the request or any of the Policy Information Points (PIPs). Moreover, if this is the only expression in the policy that involves attribute department, then it is safe to conclude that two subjects $s_1$, $s_2$ that agree on all other attributes will be given identical access rights if they both belong to department SalesDept. When evaluating the policy in order to construct an access matrix, it is safe to consider only one of these two subjects.

Thus, if a policy is examined and all the expressions involving a given subject attribute are identified, subjects whose access rights are identical, regardless of the resource they are applied to, may be identified. Analogously, by examining all expressions that mention a resource attribute, resources which are accessible to exactly the same set of subjects may be detected. Using the terminology of partial evaluation (see above) it may be stated that partially evaluating the policy with either of those two subjects (or resources) will result in the same (partially evaluated) policy, that is:

$$Q_{s_1} = P(A(s_1)) = P(A(s_2)) = Q_{s_2}.$$

As an example, an XACML policy will be considered which uses the resource-id attribute to identify resources and determine which access control rules to apply. It is assumed that resources are identified using a string of the form <type>-<number>, where <type> is a 3-letter string, and <number> is a 3-digit number. The key to identifying resources that would have identical effect under the given policy then is to determine all the expressions that use the resource-id attribute. It is assumed, further, that this policy only tests (using regular expressions) the first three characters in the resource-id (i.e., the resource type), and whether the three digits after the hyphen are "123". Any environment or action attributes are inconsequential to the policy evaluation. The identification algorithm works by going through the list of resources, extracting its first three characters from the resource-id, and also testing whether the resource-id matches "^ . . . –123.*".

Supposing that the resource list includes the following elements, where for the sake of presentation only one other resource attribute (called "classification") have been listed:

```
[
    { resource-id : mil-961, classification : confidential},
    { resource-id : mil-075, classification : confidential},
    { resource-id : txt-899, classification : confidential},
    { resource-id : snd-123, classification : public},
    { resource-id : vid-031, classification : public},
    ...
]
``` the result of evaluating the expressions of interest can be represented as two new attributes, prefix and id123:

```
[
    { resource-id : mil-961, classification : confidential,
    prefix: mil, id123: False},
    { resource-id : mil-075, classification : confidential,
    prefix: mil, id123: False },
    { resource-id : txt-899, classification : confidential,
    prefix: txt, id123: False },
    { resource-id : snd-123, classification : public, prefix: snd, id123: True },
    { resource-id : vid-031, classification : public, prefix: vid, id123: False },
    ...
]
```

The value of resource-id may then be ignored, which is possible because all the expressions that use resource-id and can affect the policy decision have been considered. Hence, it becomes apparent that the first two resources, mil-961 and mil-075, can be identified. Under any condition in the policy, as determined by the values of subject, action and other attributes, a PDP evaluating the policy will always return the same decision for mil-961 and mil-075, so that one of them, say mil-075, may be removed from the list of resources for which the policy is to be evaluated. In other words, one may define one equivalence class to which both mil-961 and mil-075 belong.

The process of identification of resources, as illustrated by the example above, is applicable to any attribute category. In particular, given the list of all subjects and their associated attributes, the same procedure may be applied to the identification of subjects. In most practical circumstances, the identification procedure reduces considerably the list of subject-resource pairs that must be considered in the construction of the access control matrix.

Figure 3:
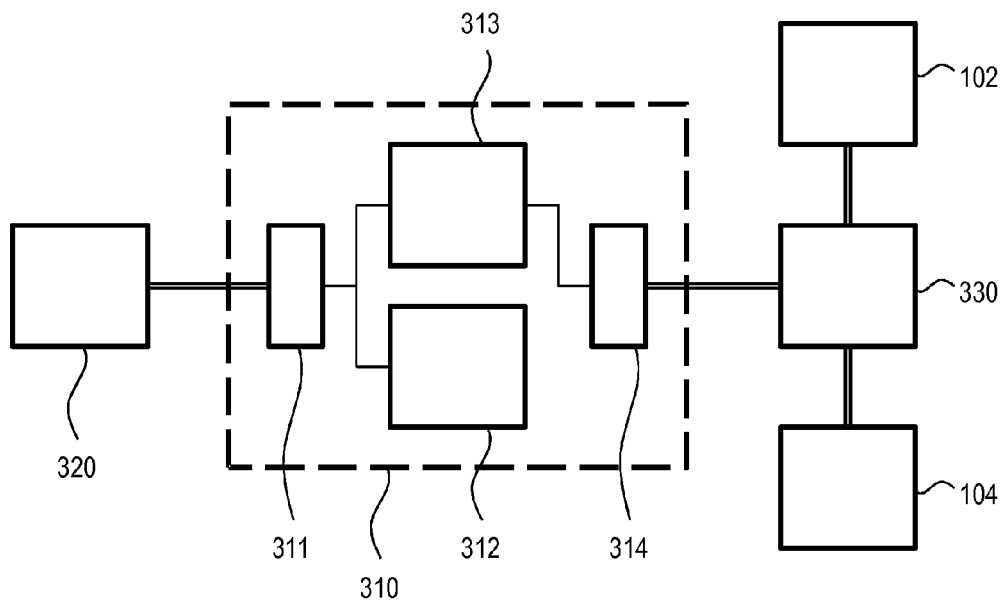
FIG. 3 is a schematic view of a legacy AC architecture supplemented with hardware in accordance with an embodiment of the invention in order to enforce an ABAC policy.

FIG. 3 is a generalized block diagram showing a computer system, partially made up of legacy components and including a subject 104 (e.g., a user terminal) and a resource 102 (e.g., a file, a webpage or a hardware device). The subject's 104 access to the resource 102 is controlled by a guard means 330 (e.g., a server) adapted to evaluate a representation of an AC matrix. The guard means 330 may however not be capable of enforcing (in particular, evaluating) an ABAC policy. A policy storage means 320, preferably a non-volatile storage, stores data representing an ABAC policy which specifies, in attribute-based form, the permissions which are currently to apply in the computer system. In typical circumstances, the ABAC policy is frequently updated, which is reflected in frequent modifications to the policy data stored in the policy storage means 320. A policy converter 310 acts as an interface between the guard means 330 and the policy storage means 320. At an input 311, the converter 310 receives or retrieves ABAC policy data from the storage means 320. A processing means 312 in the converter 310 is adapted to perform the method for policy evaluation described above and to store the result in AC matrix form in the memory 313. The AC matrix is equivalent to the ABAC policy in that it will return decisions corresponding to those of the ABAC policy. Access to the content of the memory 313 is enabled via an output 314, to which the guard means 330 is communicatively connected.

The policy converter 310 may be adapted to update the AC matrix in response to updates made to the ABAC policy. The AC matrix may be updated immediately, at predefined intervals or at predefined times. Advantageously, an updated version may be output as a separate data record in the memory 313, so that a different data record encoding the old version will remain accessible via the output 314 while the ABAC policy is being evaluated to form the AC matrix.

Further embodiments of the present invention will become apparent to a person skilled in the art after studying the description above. Even though the present description and drawings disclose embodiments and examples, the invention is not restricted to these specific examples. For instance, the invention can be applied to control access to resources outside the context of computing; as an example, access to the premises in a building can be controlled if suitable identification means (e.g., card readers, biometric sensors, which identify a person as a subject in a guarding system) and actuators (e.g., electrically controllable door locks) are provided and are communicatively connected to a computer system for enforcing the AC policy. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A computer-implemented method of evaluating an attribute-based access control (ABAC) policy for a set of elements in a computer system, wherein each element belongs to exactly one of several predefined categories,
wherein the access control policy comprises functional expressions which depend on attributes, elements in the set being associated with attribute values assumed by attributes of the respective elements,
the method comprising:
i) selecting one of the predefined categories as a primary category;
ii) for the selected category, performing the substeps of:
ii-1) extracting expressions from the policy, wherein the extraction is limited to expressions in which any attributes are associated only with elements belonging to the selected category;
ii-2) extracting, from elements in the selected category, values assumed by the attributes appearing in the extracted expressions;
ii-3) evaluating the extracted expressions for the extracted values and partitioning the elements in the primary category accordingly into at least one primary equivalence class;
vi) for an arbitrary vector comprising one element from each remaining category and an arbitrary one of said primary equivalence classes, performing the substeps of:
vi-2) evaluating the policy for a combination of the vector and an arbitrary element in the primary equivalence class, yielding a value of the policy;
vi-3) deducing, from said value of the policy, a further value of the policy for a combination of the vector and a further element in the primary equivalence class;
vii) encoding the result of the evaluation as a second data record representing results of the evaluation of the ABAC policy as policy decisions associated with n-tuples of elements; and
viii) storing the second data record.

2. The method of claim 1, wherein step ii-3 comprises forming primary equivalence classes by intersecting equivalence classes pertaining to at least two different expressions.

3. The method of claim 1,
wherein step vi includes the initial substep of
vi-1) partially evaluating the policy by constructing a partial request comprising the attributes of said element in the primary equivalence class, so as to obtain a simplified policy,
and wherein substep vi-2 includes evaluating the policy by evaluating said simplified policy for the vector.

4. The method of claim 3, wherein step vi includes the further substep of
vi-4) evaluating the policy for a combination of a further vector comprising one element from each remaining category and an element in the primary equivalence class by evaluating the simplified policy for said further vector.

5. The method of claim 1,
wherein step vi is preceded by the steps of:
iii) selecting one of the predefined categories as a secondary category and performing step ii for said secondary category, whereby the elements in the secondary category are partitioned accordingly into at least one secondary equivalence class; and
v) forming combined equivalence classes as Cartesian products of all n-ary equivalence classes, said combined equivalence classes containing n-tuples of elements from each n-ary category,
and wherein step vi includes using the combined equivalence classes and n-tuples of elements therein in the place of the primary equivalence classes and elements therein.

6. The method of claim 5,
wherein step v is preceded by the step of:
iv) selecting one of the predefined categories as a tertiary category and performing step ii for said tertiary category, whereby the elements in the tertiary category are partitioned accordingly into at least one tertiary equivalence class.

7. The method of claim 1, wherein:
step ii further comprises the substep of
ii-4) partially evaluating the policy for each primary equivalence class obtained in step ii-3 by constructing a partial request comprising the attributes of an element in each primary equivalence class, so as to obtain a simplified policy for each primary equivalence class;
the method further comprises the step of
iii) selecting a secondary category and performing step ii for said secondary category, so as to obtain a simplified policy for each combination of a primary and a secondary equivalence class; and
substep vi-2 includes evaluating the policy for a combination of a vector comprising one element from each remaining category and a pair of a primary-category elements and a secondary-category element by evaluating said simplified policy for this combination of a primary and secondary equivalence class.

8. The method of claim 1,
wherein substep ii-1 includes extracting all such expressions that contain attributes associated with elements in no other than the selected category,
and wherein, optionally, substep ii-1 includes extracting expressions having maximal length.

9. The method of claim 1, wherein the access control policy is encoded in an extensible markup language (XML).

10. A method of converting an ABAC policy into an access matrix pertaining to a set of elements, comprising:
defining a first data record representing the ABAC policy;
evaluating the ABAC policy by the method of claim 1; and
encoding the result as a second data record representing an access matrix, which depends on identities of the elements in the set and is equivalent to the ABAC policy.

11. The use of an access-matrix evaluation means for implementing a predefined ABAC policy, said access-matrix evaluation means being configured to return a policy decision in response to a request including an n-tuple of elements,
said use comprising:
generating a data record representing an access matrix on the basis of the predefined ABAC policy by the method of claim 10; and
storing the data record in a memory communicatively connected to the access-matrix evaluation means.

12. The method of claim 1, wherein the policy controls access of subjects in the set of elements to resources in the set of elements in accordance with values of the policy, including policy decisions Permit and Deny.

13. A non-transitory computer-readable storage medium storing computer-executable instructions for performing a method of evaluating an attribute-based access control (ABAC) policy for a set of elements in a computer system,
   wherein each element belongs to exactly one of several predefined categories,
   wherein the access control policy comprises functional expressions which depend on attributes, elements in the set being associated with attribute values assumed by attributes of the respective elements,
   the method comprising:
   i) selecting one of the predefined categories as a primary category;
   ii) for the selected category, performing the substeps of:
   ii-1) extracting expressions from the policy, wherein the extraction is limited to expressions in which any attributes are associated only with elements belonging to the selected category;
   ii-2) extracting, from elements in the selected category, values assumed by the attributes appearing in the extracted expressions;
   ii-3) evaluating the extracted expressions for the extracted values and partitioning the elements in the primary category accordingly into at least one primary equivalence class;
   vi) for an arbitrary vector comprising one element from each remaining category and an arbitrary one of said primary equivalence classes, performing the substeps of:
   vi-2) evaluating the policy for a combination of the vector and an arbitrary element in the primary equivalence class, yielding a value of the policy;
   vi-3) deducing, from said value of the policy, a further value of the policy for a combination of the vector and a further element in the primary equivalence class;
   vii) encoding the result of the evaluation as a second data record representing results of the evaluation of the ABAC policy as policy decisions associated with n-tuples of elements; and
   viii) storing the second data record.

14. A policy converter operable to maintain a data record representing an attribute-based access control (ABAC) policy in terms of policy decisions associated with n-tuples of elements, wherein:
   the ABAC policy relates to a set of elements in a computer system, wherein each element belongs to exactly one of several predefined categories,
   said converter comprising:
   a memory for storing data records;
   an input for receiving policy data representing the ABAC policy, which comprises functional expressions which depend on attributes, elements in the set being associated with attribute values assumed by attributes of the respective elements;
   a processing means for evaluating the ABAC policy by performing the steps of:
   i) selecting one of the predefined categories as a primary category;
   ii) for the selected category, performing the substeps of:
   ii-1) extracting expressions from the policy, wherein the extraction is limited to expressions in which any attributes are associated only with elements belonging to the selected category;
   ii-2) extracting, from elements in the selected category, values assumed by the attributes appearing in the extracted expressions;
   ii-3) evaluating the extracted expressions for the extracted values and partitioning the elements in the primary category accordingly into at least one primary equivalence class;
   vi) for an arbitrary vector comprising one element from each remaining category and an arbitrary one of said primary equivalence classes, performing the substeps of:
   vi-2) evaluating the policy for a combination of the vector and an arbitrary element in the primary equivalence class, yielding a value of the policy; and
   vi-3) deducing, from said value of the policy, a further value of the policy for a combination of the vector and a further element in the primary equivalence class;
   vii) encoding the result of the evaluation as a second data record representing results of the evaluation of the ABAC policy as policy decisions associated with n-tuples of elements;
   viii) storing the second data record; and
   an output for outputting results of the evaluation of the ABAC policy as policy decisions associated with n-tuples of elements.

15. The policy converter of claim 14, wherein the processing means is configured to update the data record in accordance with new policy data received at the input.

16. The policy converter of claim 14, wherein the policy controls access of subjects in the set of elements to resources in the set of elements in accordance with values of the policy, including policy decisions Permit and Deny.

* * * * *